United States Patent [19]
Albertson et al.

[11] Patent Number: 5,472,216
[45] Date of Patent: Dec. 5, 1995

[54] SEAL RING FOR VALVE STEM

[75] Inventors: Kenneth R. Albertson, West Valley City; Vernon R. Bolinder, West Jordan, both of Utah

[73] Assignee: Parker-Hannifin Corporation, Cleveland, Ohio

[21] Appl. No.: 316,652

[22] Filed: Sep. 30, 1994

[51] Int. Cl.⁶ .................................................. F16J 15/32
[52] U.S. Cl. ........................................ 277/165; 277/205
[58] Field of Search ..................................... 277/164, 165, 277/205, 206 R

[56] References Cited

U.S. PATENT DOCUMENTS

| | | |
|---|---|---|
| 3,169,776 | 3/1963 | Felt . |
| 3,342,500 | 8/1964 | Knudson . |
| 3,642,290 | 2/1972 | Millsap . |
| 3,645,543 | 2/1972 | Ksieski . |
| 3,653,672 | 4/1972 | Felt . |
| 3,698,728 | 10/1972 | Walker ................................ 277/165 |
| 3,885,801 | 5/1975 | Scannell . |
| 4,013,299 | 3/1977 | Scott ..................................... 277/165 |
| 4,040,636 | 8/1977 | Albertson et al. . |
| 4,174,846 | 11/1979 | Scott . |
| 4,193,606 | 3/1980 | Iverson ................................ 277/205 |
| 4,328,972 | 5/1982 | Albertson et al. . |
| 4,438,935 | 3/1984 | Lees ..................................... 277/205 |
| 4,687,212 | 8/1987 | Timpson, Jr. et al. ............... 277/165 |
| 5,297,805 | 3/1994 | Merkin et al. ...................... 277/205 |
| 5,306,021 | 4/1994 | Morvant ............................. 277/205 |

FOREIGN PATENT DOCUMENTS 4132227  4/1993  Germany .................................. 277/205

*Primary Examiner*—William A. Cuchlinski, Jr.
*Assistant Examiner*—Scott W. Cummings
*Attorney, Agent, or Firm*—Christopher H. Hunter

[57] ABSTRACT

A seal assembly for a valve stem has a primary seal ring with a relatively rigid gland member having an annular base of generally rectangular cross-section and a pair of flexible sealing lips formed in one piece with the base and extending outwardly from one side thereof. The sealing lips define a cavity for an elastomeric expander ring. The expander ring is disposed within the cavity and retained therein by the sealing lips. Each sealing lip has a sealing edge on the outer surface thereof which is pre-loaded against the valve stem and the valve housing when the primary seal ring is installed around the valve stem. Each sealing lip has a flared angle which narrows down to a thickness of between 0.033 and 0.041 inches along the length of the sealing lip between the base and the sealing edge. The expander ring also has a maximum cross-sectional dimension at substantially the midpoint of the expander ring in a direction normal to the central axis of the seal ring which is between 74% and 96% of the nominal cross-section between the valve stem and the valve housing, and each of the sealing lips has a maximum radial dimension about a plane through the midpoint and normal to the central axis which is between 2% and 13% of the nominal cross-section between the valve stem and the valve housing. The primary sealing ring with these dimensions provides enhanced sealability, reliability and dependability.

4 Claims, 2 Drawing Sheets

SEAL RING FOR VALVE STEM

FIELD OF THE INVENTION

The present invention relates to a seal ring for a valve stem to effect a seal between the valve stem and the valve housing or casing.

BACKGROUND OF THE INVENTION

Seals used in the petroleum, chemical and transportation industries must meet stringent performance requirements for sealability, reliability and durability. Seals are used for rotary and reciprocating valves, pistons and rods, and in other applications such as in packing rings, piston rings, and gland structures in industrial equipment such as pumps and compressors.

A particularly useful seal for a valve stem which has received widespread acceptance in the industrial marketplace is the U-cup seal with an expander ring. This type of seal includes a gland member having an annular base of generally rectangular cross-section, and a pair of (typically symmetrical) sealing lips formed in one piece with the base and extending outwardly from one side thereof. The sealing lips define an annular U-shaped cavity for the expander ring. The expander ring is disposed within the cavity and the sealing lips partially surround and retain the expander ring. The expander ring has a peripheral dimension which is slightly larger than the cavity such that a slight outward pre-load is provided through the sealing lips against the valve stem and valve housing when the seal is assembled around the valve stem.

One type of seal assembly utilizing a U-cup type seal is the "EC Pak", which is available from the assignee of the present invention. This seal assembly is specifically designed as a modular sealing system to control fugitive emissions of MTBE/blended gasoline or other fluids around a valve stem. The "EC Pak" includes i) one or more primary U-cup seal rings formed from a relatively rigid, thermoplastic material (e.g., PTFE, PEEK, PFA) with a temperature range from cryogenic to +500 degrees Fahrenheit and resistance to a wide range of chemicals: ii) a single, relatively flexible secondary seal ring located downstream from the primary seal ring(s) as a backup to the primary seal ring(s) and which is formed from molded synthetic rubber; and iii) a nose or backup ring, formed from a relatively rigid thermoplastic material, which is then located at the upstream and/or downstream end of the seal stack to protect the primary and secondary seal rings and prevent extrusion. The EC Pak has been found to perform satisfactorily for a valve stem seal under difficult conditions because of the flexible, self-adjusting nature of the seal stack conforming to the gap between the components, and the resistance of the primary and secondary seal rings to the corrosive or detrimental effects of the fluid, the temperatures within the valve, and the movement of the valve stem. For example, in a dynamic seal test where the fluid media consisted of a 45% aromatic blend (20% MTBE, 34% Toluene, and 46% unleaded regular gasoline), the EC Pak performed satisfactorily for over 25,000 duty cycles with only minimal 5 ppm leakage observed around a 1½" valve stem.

In the past, it is believed that the dimensions for the lips of the gland member in a U-cup type seal and for the expander ring have typically been determined using a "50% rule of thumb" method. That is, it is believed that seal designers have typically measured the cross-section of the sealing gap between the components to be sealed, and calculated 50% of this width as an appropriate maximum diameter for the expander ring. The gland lips on either side of the expander ring would then each account for about 25% of the remaining dimension. For example, for a 0.250 inch gap between components, a designer might typically choose an expander ring which has about a 0.125 inch diameter. In fact, for such a gap, it has been known to choose a 0.139 inch O-ring, which is a common O-ring dimension closest to this 50% value. Similarly, for a 0.500 inch gap, a designer might calculate 50% of this (0.250 inches), and choose an O-ring of a 0.275 inch diameter, which is the closest common O-ring dimension to this value. The "50% rule of thumb" method is believed to be based on the seal designer's belief that for typical gland members (which are usually formed from a resilient material), it is necessary to provide a substantial thickness to the lip seals for wear purposes. Such U-cup seals with these dimensional characteristics are shown in Felt, U.S. Pat. No. 3,169,776; Knudson, U.S. Pat. No. 3,342,500; and Ksieski, U.S. Pat. No. 3,645,543, among others.

It is believed that designers up to now have been satisfied using the above method to provide a seal with an acceptable level of durability, sealability and reliability for most industrial applications. However, for more demanding requirements it has been found that this method is not always acceptable. That is, for applications where a primary seal ring is formed from a material which is resistant to a wide range of chemicals, and can withstand elevated temperatures, for example Teflon, the "50% rule of thumb" method can have certain drawbacks, and in any case does not maximize the performance potential of the primary seal ring. It is believed that this due in part to the chemically resistant and temperature resistant gland materials being relatively rigid, which leads to relatively inflexible sealing lips and a relatively non-resilient expander ring which can thereby reduce the cycle duty of the seal, provide a seal which is limited in conforming to irregularities in the valve stem and valve housing, and can create heat and/or assembly problems between the components as the valve stem moves, thus reducing the overall performance characteristics of the seal. As such, while some of the above-described seals have been found to function satisfactorily in certain applications for the petroleum; chemical and transportation industries, it is believed that there is a demand in the industry for a seal with even greater performance characteristics.

SUMMARY OF THE INVENTION

The present invention provides a novel and unique primary seal for a valve stem which is useful in a broad range of industries, for example the petroleum, chemical and transportation industries, where enhanced performance characteristics are necessary. The primary seal has been determined to have significantly increased cycle duty even with relatively rigid material for the gland member so as to be resistant across a wide range of chemicals and temperatures.

The primary seal of the present invention comprises a U-cup seal with an outer gland member and an inner expander ring. The gland member is formed from a relatively rigid thermoplastic material, for example Teflon, which is resistant to a wide range of fluids to be sealed and can withstand elevated temperatures, while the expander ring can be formed from a flexible elastomer or from a metal spring. The gland member includes an annular base designed to be oriented in the downstream direction of the gap between the valve stem and the valve housing, and a pair of symmetrical sealing lips formed in one piece with the base and extending outwardly from the base in the upstream direction. The lips of the gland member define an annular U-shaped cavity.

The expander ring is located within the U-shaped cavity in the gland member and retained by the lips. The expander ring has a dimension which is slightly larger than the expander ring cavity such that the lips are biased outwardly. Each lip has a sealing edge on the outer surface thereof such that when the primary seal is assembled within the gap between the components, a pre-load is provided at the sealing lips to seal the lips against the valve stem and the valve housing or casing.

Each sealing lip has a flared angle extending from the top of the base to the sealing lip edge. Each sealing lip flared angle preferably narrows down to a thickness which does not exceed 0.041 inches, and is preferably between 0.033 and 0.041 inches, along the length of the flared angle between the base and the sealing edge on the lip. Additionally, the maximum cross-sectional dimension of the expander ring at the midpoint of the ring is preferably between 74% and 96% of the nominal cross section of the gap to be sealed, and each of the sealing lips at a plane through the midpoint of the expander ring preferably has a radial dimension (thickness) of between 2% and 13% of the remainder of the cross-section of the gap.

One or more primary seals of the above-described dimensions can be located upstream in the gap between the valve stem and the valve housing, along with one or more secondary, flexible (e.g., rubber) U-cup seal rings located downstream of the primary seal rings, and one or more rigid backup rings on the upstream and/or downstream end of the seal ring stack to prevent extrusion.

By dimensioning the expander ring and gland member in the primary seal ring using the above criteria, the lips of the gland member are more flexible, which leads to increased cycle duty, reduces heat generation and/or assembly problems between the gland and the components to be sealed, and provides a greater ability to conform to irregularities in the components, even though the gland member itself is formed from relatively rigid material to resist chemical and temperature deterioration. Moreover, the increased diameter of the expander ring provides increased flexibility and resiliency for the seal, which also leads to better over-all sealing characteristics.

As such, the primary seal ring of the present invention has been shown to provide enhanced performance characteristics, and in particular, unexpectedly high cycle duty for sealing a valve stem.

Further features and advantages of the present invention will become apparent upon reviewing the following specification and accompanying drawings.

DETAILED DESCRIPTION OF THE PREFERRED EMBODIMENT

Figure 1:
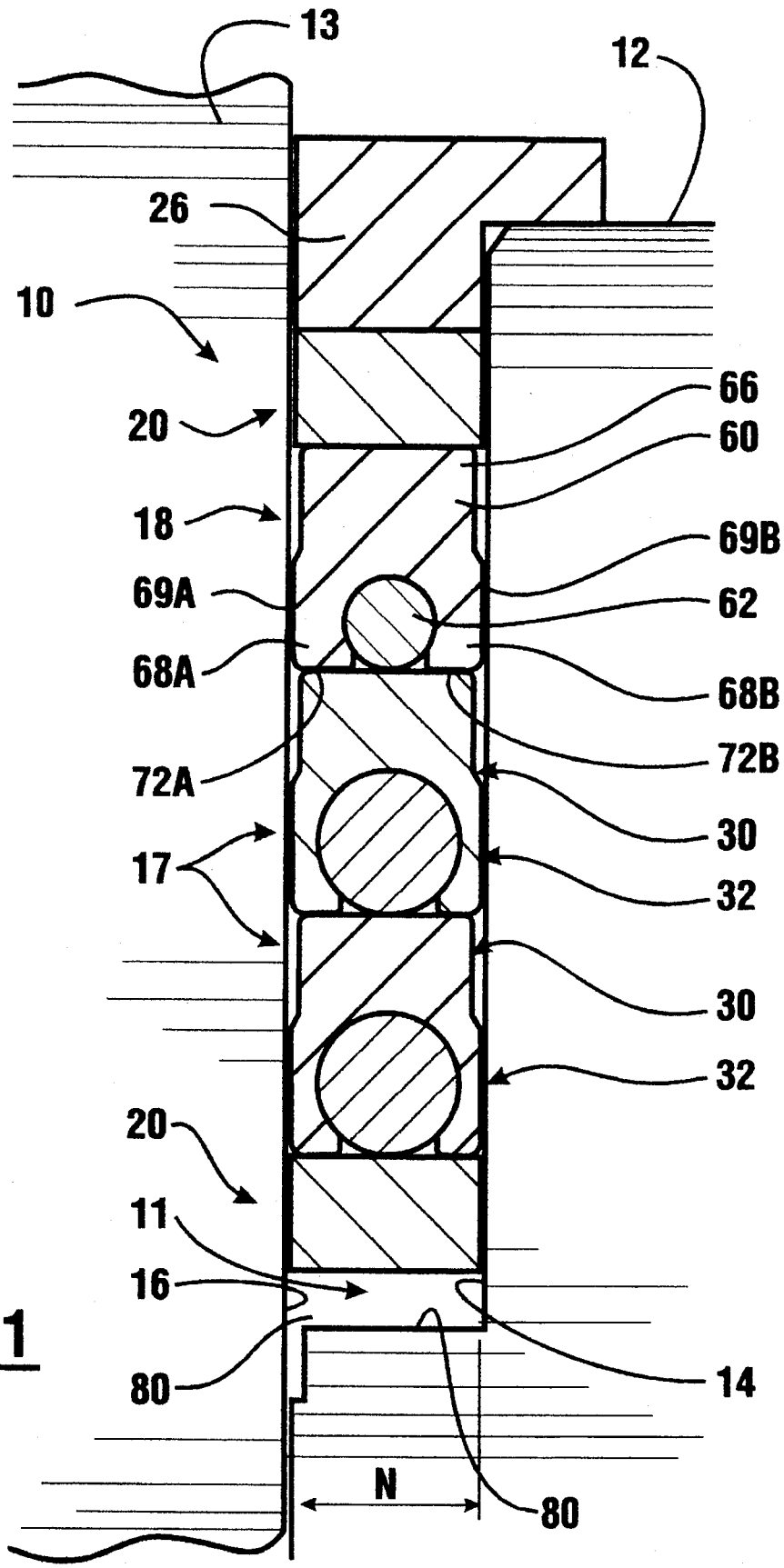
FIG. 1 is a cross-sectional view of a seal assembly having primary seal rings constructed according to the principles of the present invention.
Figure 2:
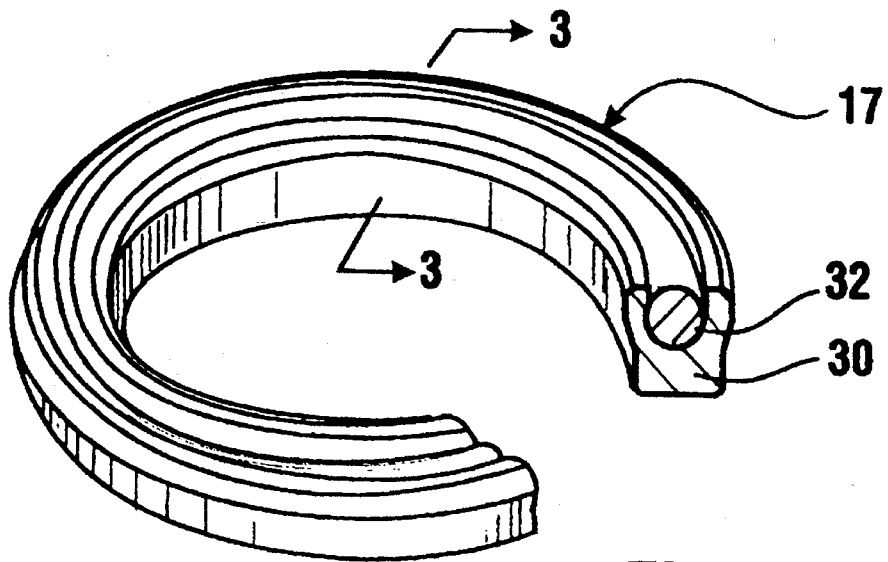
FIG. 2 is a perspective view of a portion of one of the primary seal rings of the seal assembly of FIG. 1 with a section removed for clarity.

Referring to the drawings, the seal of the present invention is designed to be used with a seal assembly or stack of seals, indicated generally at 10. The seal assembly is designed to seal an annular channel, cavity or gap, indicated generally at 11, between components, for example between a valve housing or casing member 12 and a valve stem 13. The gap 11 is defined by an inner, axially-extending surface 14 of housing member 12; radially-extending end wall surface 15 of housing member 12; and inner, axially-extending surface 16 of valve stem 13. Fluid pressure is typically provided at the downstream end of the stack (i.e., from the bottom of the gap 11 as viewed in FIG. 1).

The seal assembly 10 preferably includes a number of ring-shaped elements stacked within the annular gap 11. For example, the seal assembly can comprise one or more primary seal rings, indicated generally at 17, located downstream within the gap; one or more secondary seal rings, for example as indicated generally at 18, located upstream of the primary seal rings; and one or more nose or backup seal rings, indicated generally at 20, at the upstream and/or downstream end of the seal stack. Finally, an annular gland follower or valve bonnet 26 can be located at the open upper end of the gap to retain the ring elements within the gap. The follower or bonnet 26 can be attached to the housing member 12 such as by threads, bolts, or other appropriate attachment means.

Figure 3:
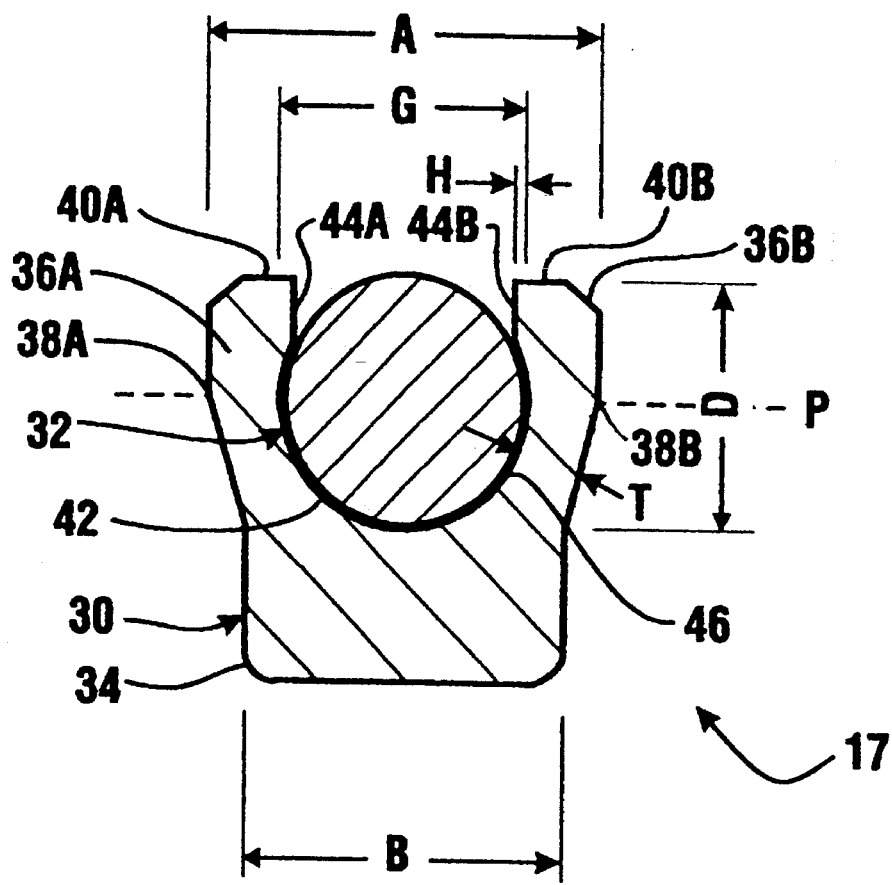
FIG. 3 is an enlarged cross-sectional view of the primary seal ring taken substantially along the plane defined by the lines 3—3 of FIG. 2.

The present invention relates specifically to the primary seal rings 17 for the seal assembly. Each primary seal ring preferably comprises a U-cup seal with an outer gland member, indicated generally at 30, and an inner expander ring, indicated generally at 32. As shown in detail in FIG. 3, the outer gland member 30 includes an annular base 34 with a rectangular cross-section which is oriented toward the downstream direction (toward the top in FIG. 1 ) of the seal gap, and a pair of symmetrical sealing lips 36A, 36B formed in one piece with base 34 and extending outwardly on one side thereof toward the upstream direction of the seal gap (toward the bottom in FIG. 1). The gland member 30 is preferably formed from a relatively rigid thermoplastic material, for example an injection-molded Teflon material (PEEK, PFA, PTFE, etc.) which is resistant to a wide range of chemicals and a wide range of operating temperatures. The gland member typically has a hardness (durometer reading) of 50–80 on the Shore D scale. The gland member can be formed using techniques well-known to those skilled in the art.

The base 34 of the gland member has a width B which is chosen so as to extend across a portion of the seal gap 11. Preferably, the dimension B is chosen so as to be at least 2%, and preferably 5%–15%, less than the nominal cross-section N (FIG. 1 ) of the seal gap. This allows for easier installation of the seal ring in the gland and provides a tolerance band for molding purposes. The gland member then tapers outwardly from base 34 at a flared angle to outer sealing edge 38A, 38B, respectively. The outer sealing edge 38A, 38B provide the primary sealing function against the valve stem and valve housing. The outer dimension A of the lips is chosen so as to be slightly larger than the nominal cross-section N of the seal gap such that when the gland member is inserted into the seal gap, a slight pre-load is provided at the sealing edges against the valve stem and valve housing. This pre-load is also provided by the expander ring 32, as will be described herein in more detail.

The flared angle on each sealing lip narrows down to a radial dimension T (thickness) which does not exceed 0.041 inches, and is preferably between 0.035 and 0.041 inches, along the length of the lip between the base of the gland member and the sealing edge. The minimum point at which the lips narrows down to is referred to as the "flex point" of the lip. Each lip then tapers inwardly at a chamfered surface at preferably a 35–45 degree angle to a flat distal end on the gland. Specifically, lip 36A tapers inwardly to a flat distal end 40A, while lip 36B tapers inwardly to a flat distal end 40B. The distal ends 40A, 40B are designed to contact an adjacent seal ring or other ring element when the seal rings are assembled together.

The lips 36A, 36B define a central annular recess or cavity 42 for the expander ring 32. The cavity 42 is formed by flange portions 44A, 44B which extend inwardly a distance H from the distal ends 40A, 40B respectively, of each lip, and then define a inner U-shaped cavity 46 (as viewed in cross-section) which is shaped so as to receive the expander ring 32. The sealing lips 36A, 36B partially surround the expander ring and retain the ring tightly within the cavity of the gland member. When assembled, the expander ring is wholly received within the cavity and preferably does not extend past the distal ends of the sealing lips. That is, the gland member and expander ring are dimensioned such that the diameter G of the expander ring is equal to or slightly less than the depth D of the expander ring cavity 46. When the primary seal ring is assembled within the seal stack, no compression forces are applied to the expander ring above the horizontal centerline of the expander ring. This is believed to uniformly load the expander ring to prolong the life thereof.

The expander ring is preferably formed from appropriate resilient material which is resistant to the fluid and temperatures within the valve. Preferably, the expander ring is an O-seal formed from an elastomeric material, or is a metal O-spring. The expander ring has an annular cross-section with a maximum diameter G which is preferably chosen so as to be between 74% and 96% of the nominal cross-section N of the gap 11. Each of the sealing lips 36A, 36B thereby preferably has a maximum radial dimension at a plane P through the midpoint of the expander ring of between 2% and 13% of the nominal cross-section N of the gap 11. The expander ring also has a dimension which is slightly larger than the cavity for the ring such that the expander ring biases the sealing lips outwardly, and when the primary seal is assembled around a valve stem, the lip seals 68A, 68B are pre-loaded against the valve stem and the valve housing.

In dimensioning the gland member 30 and expander ring 32 in the above-described manner, the seal lips of the primary seal are relatively flexible, particularly about the "flex point" along the lips, even though the gland member is formed from a relatively rigid material to resist the chemicals and temperatures in the valve. Moreover, the expander ring is also more flexible and resilient which increases the overall sealing capabilities of the primary seal. As such, the primary seal has greater dependability, sealability and reliability for sealing the valve stem.

The secondary seal ring 18 of the seal assembly preferably also comprises a U-cup seal with an outer gland member 60 and an inner expander ring 62. The outer gland member 60 is preferably formed from a resilient material which is compatible with the fluid being sealed. The secondary seal ring is typically more susceptible to the degrading characteristics of the chemicals in the valve than the primary seal ring(s). However, the secondary seal ring provides an important backup seal function for fluid passing by the primary seal rings and is normally protected from the chemicals by the primary seal rings. A wide range of resilient compounds, and in particular synthetic rubber compounds, can be used for the gland member of the secondary ring, for example nitrile or Kalrez (a trademarked product from Dupont). The secondary ring can also be formed using techniques well-known to those skilled in the art.

The gland member 60 of the secondary seal ring includes an annular base 66 located toward the downstream side of the gap (toward the top in FIG. 1 ), and a pair of symmetrical sealing lips 68A, 68B formed in one piece with base 66 and extending outwardly from the upper side of the base and upstream therefrom (toward the bottom in FIG. 1 ). The base 66 preferably has a dimension which extends across a portion of the cross-section of gap 11. Preferably, the radial dimension of the base 66 is chosen to be at least 5% smaller than the nominal cross-section N of the sealing gap 11 to facilitate installation of the seal ring and provide a tolerance band for molding.

The sealing lips 68A, 68B of the secondary seal ring also have flared angles out to sealing edges 69A, 69B respectively, which are normally in sealing contact with the opposing inside sidewalls 14, 16 of the valve stem and valve housing. The sealing lips 68A, 68B then have a chamfered angle which tapers inwardly toward their distal ends 72A, 72B, respectively. The inside surface of the sealing lips 68A, 69B defines an annular U-shaped groove or channel for the expander ring 62. Finally, the distal ends 72A, 72B of lips 68A, 68B respectively, have inwardly-directed flanges which retain the expander ring 62 within the cavity, and the outer surface of which provides an engaging surface for an adjacent seal ring or element.

The expander ring 62 is dimensioned to be tightly received within the cavity formed by the seal lips 68A, 68B of the gland member 66, and provides a slight amount of outwardly-directed bias against the seal lips such that the lips are pre-loaded against the opposing inside side walls 14, 16 of the valve stem and the valve housing when assembled. The expander ring for the secondary seal is also formed from a compressive and resilient material, for example an elastomer, or can be formed as a metal spring.

The annular nose or backup rings 20 are preferably also formed from a relatively rigid thermoplastic material which is resistant to a wide range of chemicals and operating temperatures, for example injection-molded Teflon. The backup rings can also be formed using techniques well-known to those skilled in the art. Backup rings 20 are normally dimensioned to extend across a portion of the cross-section of the gap and are designed to protect the primary and secondary seal rings of the seal assembly and to prevent extrusion. Preferably, the backup rings have a radial dimension which is at least 5% smaller than the nominal cross-section N of the sealing gap 11 to facilitate installation and provide a tolerance band for molding. An annular gap or cavity 80 is preferably provided between the upstream backup ring and the end wall 15 of the sealing gap 80. This gap is at least 5% and preferably 15% of the entire axial length of the seal assembly and provides space for swelling of the ring elements during use.

Preferred dimensions for a primary seal ring constructed according to the principles of the present invention for a 0.375 inch gap around a valve stem are as follows (in inches):

A: 0.413 G: 0.338 O-ring cross-section diameter: 0.344

Likewise, for a 0.500 inch gap, the dimensions are as follows (in inches):

A: 0.550 G: 0.460 O-ring cross-section diameter: 0.468

Tests have been performed for a primary seal constructed according to the principles of the present invention. It is believed that these tests provide significantly enhanced results over primary seals constructed according to the typical "rule of thumb" method wherein the expander ring has a dimension which is approximately 50% of the nominal cross-section of the seal gap.

For a seal assembly having primary seals constructed according to the principles of the present invention (e.g., a primary seal with sealing lips narrowing down to 0.033 inches between the base and the sealing edge), wherein the assembly included a pair of primary seals located toward the downstream end of the seal gap, a single secondary seal located at the upstream end, and a backup ring located at both the upstream end and downstream end of the seal stack, the test results were as follows:

| Pressure | Rod Speed | Rod Temp. | Test Pod Temp. | Actual No. of Cycles |
|---|---|---|---|---|
| 750 psi | 12 inches/min. | 46° F.–84.0° F. | 38.6° F.–83.1° F. | 95,984 |

The cycling test simulates the opening and closing of a valve by raising and lowering a shaft with the seal ring therearound. One cycle consists of raising the shaft, pausing one second, lowering the shaft, and pausing again for one second. The fluid media for the test was: 45% aromatic blend (20% MTBE, 34% Toluene, and 46% unleaded regular gasoline). The cycling test was run until dynamic emissions exceeded 500 ppm.

Therefore, as described above, the present invention provides a primary seal ring for a seal assembly with unexpected performance characteristics such that seal ring exhibits long life, dependability and durability for sealing a valve stem.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

What is claimed is:

1. A sealing ring for installation between two members spaced apart a predetermined distance, said sealing ring comprising:

i) a relatively rigid annular base of generally rectangular cross-section and a pair of relatively flexible sealing lips formed in one piece with said base and extending outwardly from one side of said base, said sealing lips defining a cavity for an expander ring and each lip has a sealing edge on an outer surface thereof for sealing contact with one of said members, and ii) a resilient expander ring disposed in the cavity between the sealing lips, said sealing lips at least partially surrounding and retaining said expander ring within the cavity, each of said sealing lips narrowing down between said base and said sealing edge to a cross-sectional dimension which is between 0.033 inches and 0.041 inches at the narrowest point along the lip, and said expander ring having a maximum cross-sectional dimension substantially at the midpoint of the expander ring which is between 74% and 96% of said predetermined distance, and each of said sealing lips having a maximum dimension about a plane through said midpoint and normal to said direction which is between 2% and 13% of said predetermined distance.

2. The sealing ring as in claim 1, wherein said gland member is formed from thermoplastic material.

3. The sealing ring as in claim 2, wherein said sealing lips define a U-shaped channel in said gland member.

4. A sealing ring disposed with a plurality of ring elements in a gap between a valve stem and a valve housing for the stem to prevent fluid under pressure from flowing between the stem and the housing, said sealing ring comprising:

i) a relatively rigid annular base of generally rectangular cross-section circumscribing a central axis and directed toward a downstream direction between the two members, and a pair of relatively flexible sealing lips formed in one piece with said base and extending outwardly from a side of said base in an upstream direction, said sealing lips defining an annular cavity disposed in a plane substantially normal to said central axis and opening toward the upstream direction and each of said sealing lips has a sealing edge on an outer surface thereof in sealing contact with one of said valve stem or said valve housing, and ii) an expander ring disposed in the cavity between the sealing lips, each of said sealing lips narrowing down between said base and said sealing edge to a cross-sectional dimension which is between 0.033 inches and 0.041 inches at the narrowest point along the lip, said expander ring also having a maximum cross-sectional dimension at the midpoint of the expander ring in a direction normal to the central axis which is between 74% and 94% of said predetermined distance, and each of said sealing lips having a maximum radial dimension about a plane through said midpoint and normal to said central axis which is between 3% and 13% of said predetermined distance.

* * * * *